United States Patent [19]

Cole et al.

[11] Patent Number: 5,166,909
[45] Date of Patent: * Nov. 24, 1992

[54] METHOD OF SEISMIC EXPLORATION USING ELLIPTICALLY POLARIZED SHEAR WAVES

[75] Inventors: Jack H. Cole; John S. Gergely, both of Ponca City, Okla.

[73] Assignee: Conoco Inc., Ponca City, Okla.

[*] Notice: The portion of the term of this patent subsequent to Aug. 1, 2006 has been disclaimed.

[21] Appl. No.: 166,761

[22] Filed: Mar. 3, 1988

Related U.S. Application Data

[63] Continuation of Ser. No. 897,448, Aug. 18, 1986, abandoned.

[51] Int. Cl.$^5$ ............................................. H04R 11/00
[52] U.S. Cl. ..................................... 367/189; 367/75; 181/112; 181/113
[58] Field of Search ........................... 181/102–106, 181/108–114, 116–121, 401, 402; 367/48, 49, 75, 140, 142, 143, 189, 190, 911, 912; 75/663, 667, 672; 310/81; 74/64, 87

[56] References Cited

U.S. PATENT DOCUMENTS

| | | | |
|---|---|---|---|
| 3,034,594 | 5/1962 | Menzel et al. | 367/49 |
| 3,185,250 | 5/1965 | Glazier | 181/401 X |
| 3,280,935 | 10/1966 | Brown | 367/189 |
| 3,309,877 | 3/1967 | Degen | 175/55 X |
| 3,504,756 | 4/1970 | Bodine | 181/114 |
| 3,587,774 | 6/1971 | Bemrose et al. | 181/401 X |
| 3,683,326 | 8/1972 | White | 367/75 X |
| 4,164,982 | 8/1979 | Draney | 172/40 |
| 4,321,981 | 3/1982 | Waters | 367/189 X |
| 4,542,487 | 9/1985 | Benzing et al. | 181/112 X |
| 4,605,089 | 8/1986 | Kravchenko et al. | 181/401 X |
| 4,853,906 | 8/1989 | Cole | 367/189 |

FOREIGN PATENT DOCUMENTS

| | | | |
|---|---|---|---|
| 0672588 | 7/1979 | U.S.S.R. | 181/121 |
| 2091420 | 7/1982 | United Kingdom | 367/75 |

OTHER PUBLICATIONS

Crampin, Stuart, Shear Wave Polarization: A Plea for Three-Component Recording p. S12.7 Soc. Explor. Geoph. Las Vegas Nev., 1985, pp. 425–427.
Richart et al. Vibration of Soils & Foundations, 1970, pp. 80–92.
S. Hayashi et al, "A New Dynamic Control 4–Moment Vibration Generator", Meiden Rev. (Int. ed.) (Japan) Ser. No. 63, No. 3, 1981, pp. 32–36.

Primary Examiner—Brian S. Steinberger

[57] ABSTRACT

The present invention relates to methods of seismic exploration utilizing vibrationally generated, elliptically polarized shear waves in an earth medium for subsequent detection of one or more dimensions of orthogonal particle motion. The invention relies upon a shear wave source of a type which couples a continually rotating longitudinal force into an earth medium thereby to propagate an elliptically polarized shear wave for refraction, reflection or subsurface detection, various forms of exploration being well within the capabilities.

19 Claims, 4 Drawing Sheets

METHOD OF SEISMIC EXPLORATION USING ELLIPTICALLY POLARIZED SHEAR WAVES

This is a continuation of co-pending application Ser. No. 897,448 filed on Aug. 18, 1986 now abandoned.

CROSS-REFERENCE TO RELATED APPLICATIONS

The present invention is related subject matter relative to copending U.S. Pat. applications Ser. No. 897,434, entitled "Apparatus for Generating Elliptically Polarized Shear Waves" now abandoned., and Ser. No. 897,442, entitled "Method and Apparatus for Inducing Elliptically Polarized Shear Waves in an Earth Medium", each concurrently filed herewith now abandoned.

BACKGROUND OF THE INVENTION

1. Field of the Invention

The invention relates generally to seismic exploration and, more particularly, but not by way of limitation, it relates to improved exploration methods utilizing elliptically polarized shear waves that carry a greater amount of information as contained in each of compressional and shear waves.

2. Description of the Prior Art

The present inventors are aware of no prior use of elliptically polarized shear waves in seismic exploration practice. While numerous procedures have been utilized for a number of years for both compressional wave exploration and shear wave exploration, there apparently has been no conception of the existence of an orderly elliptically polarized shear wave, circular in the specific case, which imparts particle motion in three orthogonal dimensions as it travels through an earth medium. Accordingly, it is now conceived that the particle motion of the elliptically polarized shear wave can be detected by one or more three-dimensional orthogonal detectors to carry out any of vertical seismic profiling (VSP) procedures, refraction or reflection surveys, three-dimensional seismic surveys, and related seismic sounding practices.

The closest prior teaching yet discovered is a paper S12.7 presented at the 1983 meeting for the Society for Exploration Geophysics in Las Vegas, Nev., entitled "Shear Wave Polarizations: A Plea for Three-Component Recording" by Stuart Crampin. While this paper recognized the fact that a greater of volume of knowledge may be extracted from shear wave data and that such additional data would show up through three-dimensional detection, the author was not aware of the elliptic polarization character of such shear waves and their adherence to specific propagation properties.

SUMMARY OF THE INVENTION

The present invention relates to methods of seismic exploration utilizing vibrationally generated, elliptically polarized shear waves in an earth medium for subsequent detection of three-dimensional orthogonal particle motion. It is contemplated that the elliptically polarized shear waves be utilized for any of vertical seismic profiling, borehole logging, and seismic surveying, including three-component surveys. In addition, it is foreseen that the elliptically polarized shear wave source can be used for marine surveying as in most cases the source may be engaged at the water bottom.

Therefore, it is an object of the present invention to provide a seismic source that enables detection of a greater volume of usable information for a given vibrational sounding procedure.

It is also an object of the present invention to provide method and apparatus for generating precise elliptically polarized shear waves in an earth medium.

It is still further an object of the present invention to provide a method for generating and detecting new and heretofore unutilized earth particle motion relationships.

Finally, it is an object of the present invention to provide a method utilizing elliptically polarized shear waves wherein the vibration source may be coupled variously to the earth medium either at surface, water bottom or borehole with equal effectiveness.

Other objects and advantages of the invention will be evident from the following detailed description when read in conjunction with the accompanying drawings which illustrate the invention.

DETAILED DESCRIPTION OF THE INVENTION

Figure 1A:
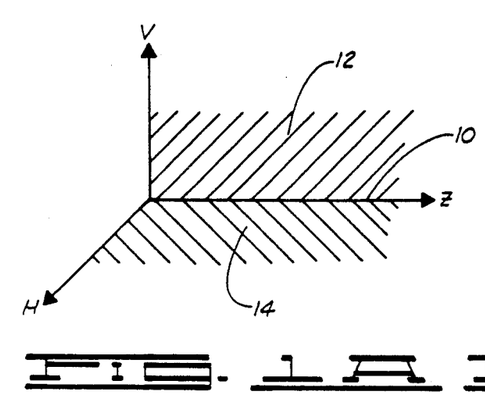
FIG. 1A is a graphic illustration of horizontal and vertically polarized shear wave relationships.

In terms of acoustic wave theory, direction of polarization is generally defined as the direction of vibration of particles in the medium through which the acoustic energy is travelling. For compressional waves the particle vibration direction is coaxial with the ray path or direction of propagation along the Z-axis. For horizontal shear and vertical shear waves, the particle vibration paths are at right angles to the propagation direction. Thus, as shown in FIG. 1A, compressional wave particle vibration would be in alignment with the Z-axis 10, the axis of propagation, while particle motion of vertical shear waves would be within the plane 12, and horizontal shear wave particle displacement would be within plane 14. Planes 12 and 14, containing the respective vertical shear and horizontal shear vibrations, are called the planes of polarization. Thus, pure horizontal shear and vertical shear waves are referred to as plane polarized waves.

Figure 1B:
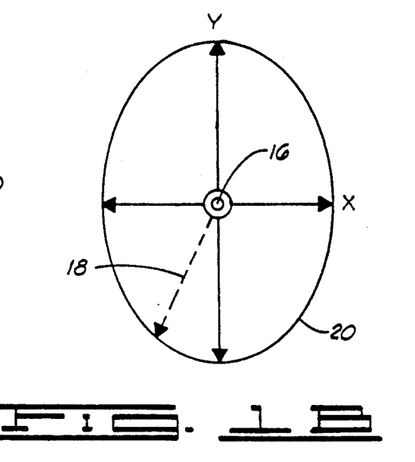
FIG. 1B is a graphic illustration of elliptically polarized shear wave relationships.

A more specific type of shear wave polarization is termed elliptical polarization and this pattern is essentially outlined in FIG. 1B. Thus, the Z-axis 16 may be thought of as emerging from the drawing page, and a particle displacement vector 18 in a plane perpendicular to the propagation direction Z traces out an ellipse 20 in each cycle of vibration.

Particle displacement in elliptical polarization may be thought of as being composed of two components which are perpendicular to the direction of propagation. Consider two plane-polarized shear waves of the same frequency whose particle displacements are given by:

$$\vec{D_x} = \vec{a_x} D_1 \cos(wt - kz)$$
$$\vec{D_y} = \vec{a_y} D_2 \cos(wt - kz + \phi) \quad (1)$$

Where k is equal to a propagation constant, $D_1$ and $D_2$ are displacement amplitudes, and $a_x$ and $a_y$ are unit vectors in the x and y directions, respectively. Both waves are travelling in the z direction, but are polarized perpendicular to each other and have a phase difference $\phi$. Total displacement at any point on the Z-axis (assuming zero attenuation) is given by:

$$\vec{D} = \vec{a_x} D_1 \cos(wt - kz) + \vec{a_y} D_2 \cos(wt - kz + \phi) \quad (2)$$

For the case where $\phi$ is equal to $+\pi/2$, expanding the above equation gives:

$$\vec{D} = \vec{a_x} D_1 \cos wt - \vec{a_y} D_2 \sin wt \quad (3)$$

For the case where $D_1/D_2 < 1$, the resultant displacement vector traces out an ellipse with its major and minor axes coincident with the respective y and x axes, as shown in FIG. 1B. If $D_1/D_2 < 1$, the major and minor axes of the ellipse coincide oppositely with the x and y axes, respectively. Looking into the beam or z axis as shown in FIG. 1B, the vector 18 rotates in the clockwise direction at an angular frequency w, and it may be termed a right elliptically polarized wave. If $\phi$ is set equal to $-\pi/2$, the resultant vector path would still trace out the similar ellipse as shown in FIG. 1B, except that the displacement vector would sweep in the counterclockwise direction and would be termed left elliptically polarized.

Another special case is when $D_1 = D_2$, and this causes the ellipse in FIG. 1B to become circular. Again, depending upon the plus or minus value of $\phi$, the wave may be right or left circularly polarized. In general, $D_1$ need not equal $D_2$, and the angle $\phi$ may assume values other than plus or minus $\pi/2$ in which case the major and minor ellipse axes will not coincide with the respective x and y axes.

Elastic shear waves and electromagnetic radiation are similar in many respects such that analogies of wave behavior may be used in explanation. When polarized waves impinge upon or interact with materials, different polarization states of incident radiation often do not act with the material in the same way. In such cases of asymmetrical interactions, the polarization state of the impinging wave is modified or changed by the interaction. By measuring the modification of a known polarization state by a material, one may learn a number of things about the material.

Due to the analogous behavior numerous measurement techniques which have been developed in the field of optics may also relate to measurements using elastic shear waves. One such technique is called ellipsometry, which is the study of the changes in the polarized states of light after reflection from a surface. By measuring the ellipsometric parameters such as relative phase change, relative amplitude attenuation and related parameters, one can determine specific constants of materials and effect selected measurements. While it is not possible at this time to foresee all applications of elliptically polarized seismic waves in exploration activities, it is now believed that use of such energy will find applications in all of well logging, VSP profiling and surface seismic surveys.

Figures 2A, 2B:
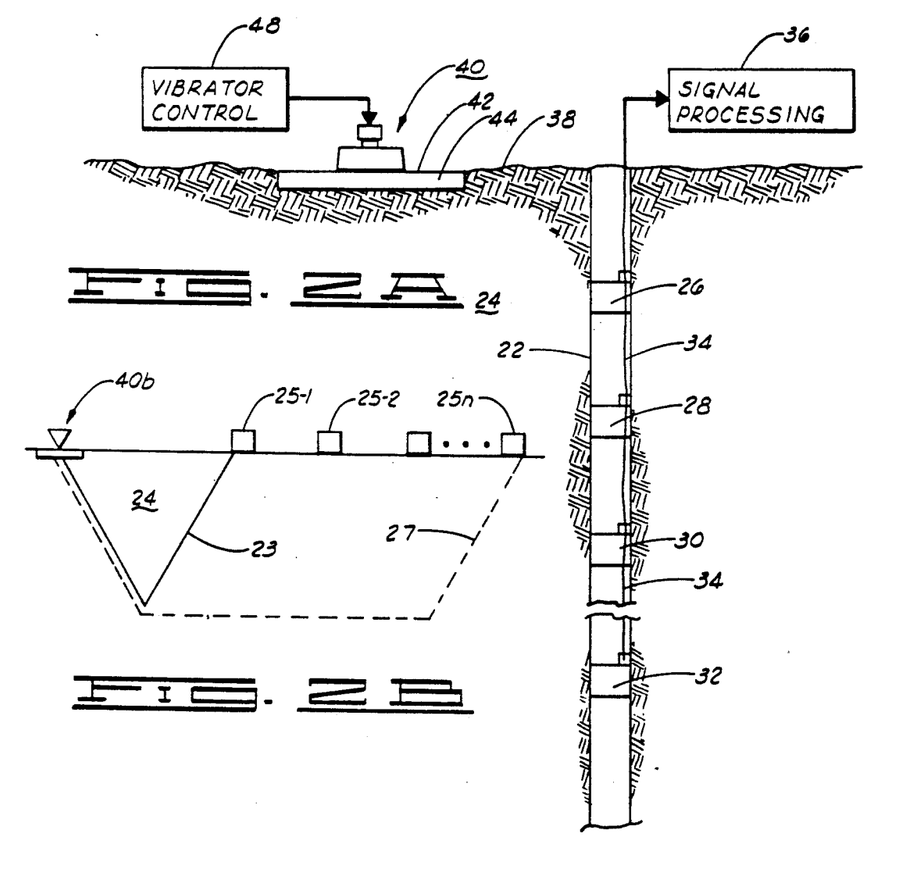
FIG. 2A is an idealized view in section of a portion of the earth surface with borehole and shear wave vibrator apparatus engaged thereon.
FIG. 2B is an idealized view of an earth section with orbital vibrator and detectors showing reflection and refraction ray paths.

FIG. 2A illustrates a set up of the type where actual testing of the present method was initially carried out. A borehole 22 formed in an earth section 24 was rigged to contain up to 12 three-dimensional orthogonal geophones 26, 28 through 30, 32. These geophones are standard three-component orthogonal detectors which have a separate pick-up for each of the x, y and z axes of vibration. The pick-ups 26–32 were disposed 100 feet apart downward along borehole 22, and a connector cable 34 of multi-conductor type connected each geophone 26–32 to the signal processing station 36 disposed on surface 38.

An orbital type seismic vibrator 40, as will be further described, was placed in firm engagement with earth surface 38 by burying baseplate 42 in the earth medium so that side walls 44 were in omni-directional, horizontal compressional contact with the earth medium. Orbital vibrator 40 was operated by a seismic vibrator control 48 at prescribed frequency and duration. While selected frequency vibrator control is recited here, the orbital vibrator 40 may be operated under any of pulse, swept frequency or continuous frequency control.

FIG. 2B illustrates the elliptical shear wave vibrator 40b as used in a seismic survey along a selected survey line. Detectors 25-1 through 25-n, e.g. selected multi-component or orthogonal detectors, are aligned along the line of survey as energy from shear wave vibrator 40b propagates downward for subsequent reflection (path 23) and/or refraction (path 27), and detection of vibrational particle motion occurs along the seismic line at detectors 25-1, n. Thus, the elliptical seismic source and multi-component detection schemes may be used variously, including multi-line, three-dimensional surveying.

Figure 3:
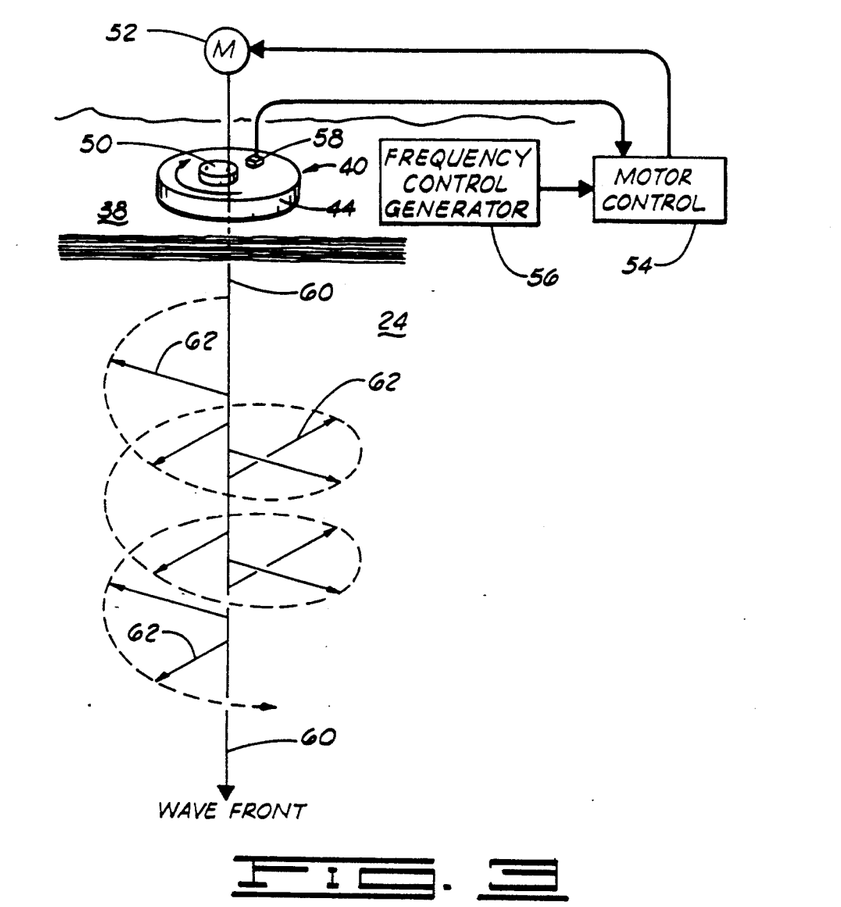
FIG. 3 is a perspective view of an elliptically polarized shear wave vibrator and earth section illustrating propagation pattern for an elliptically polarized shear wave.

FIG. 3 illustrates the orbital vibrator 40 in relation to the propagated elliptically polarized shear wave energy. Thus, vibrator 40 is operated by an eccentric weight 50 rotated by a drive motor 52 in response to a motor control 54. The motor control 54 receives control signal input from generator 56 and feedback signal from an error detector 58, e.g. an accelerometer. The orbital vibrator 40 is securely engaged against earth surface 38 and functions to propagate energy along such as ray path 60 into earth surface 38. As the particle motion propagates with particle movement continually in a plane perpendicular to ray path 60, the representative vector 62 of particle motion, (vector 18 of FIG. 1B,) rotates thereabout. The displacement vector 62 sweeps out a helix as it progresses downward and the displacement vector 62 may vary between minor and major axes depending upon the elliptical function of the generation scheme. Thus, frequency control generator 56 determines the cyclical rate of propagation of the elliptically polarized shear wave, and the configuration as to ellipsoid versus circular will depend upon the displacement forces contributing to the minor and major axis formations.

Figure 4:
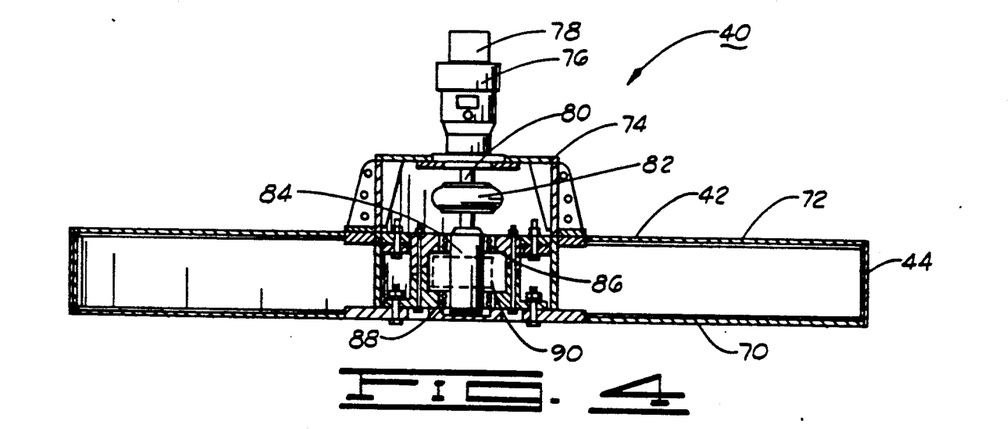
FIG. 4 is a cross-section through a form of elliptically polarized shear wave vibrator as used in the FIG. 2 scheme.

FIG. 4 illustrates an orbital vibrator 40 of relatively simple form. The vibrator 40 has a baseplate 42 that is formed as a flat cylinder having an earth engaging bottom 70, cylindrical side wall 44 and top plate 72. The bottom plate 70 is most generally formed with cleats or other earth engaging structure which assures rigid shear connection to the earth medium. A motor housing 74 connected over the center of baseplate 42 supports such as a hydraulic motor 76 that functions under control of a servo valve 78 and associated hydraulic control structure (not shown). Hydraulic motor 76 provides drive rotation via a shaft 80 through such as a PARA-FLEX TM coupling 82 to a drive shaft 84 which is rotatably mounted within an upper bearing 86 and a lower bearing 88. An eccentric mass rotor 90 (dashlines) secured on drive shaft 84 then rotates to provide orbital motion as transmitted through baseplate structure 42 into the contacting medium.

Figure 5:
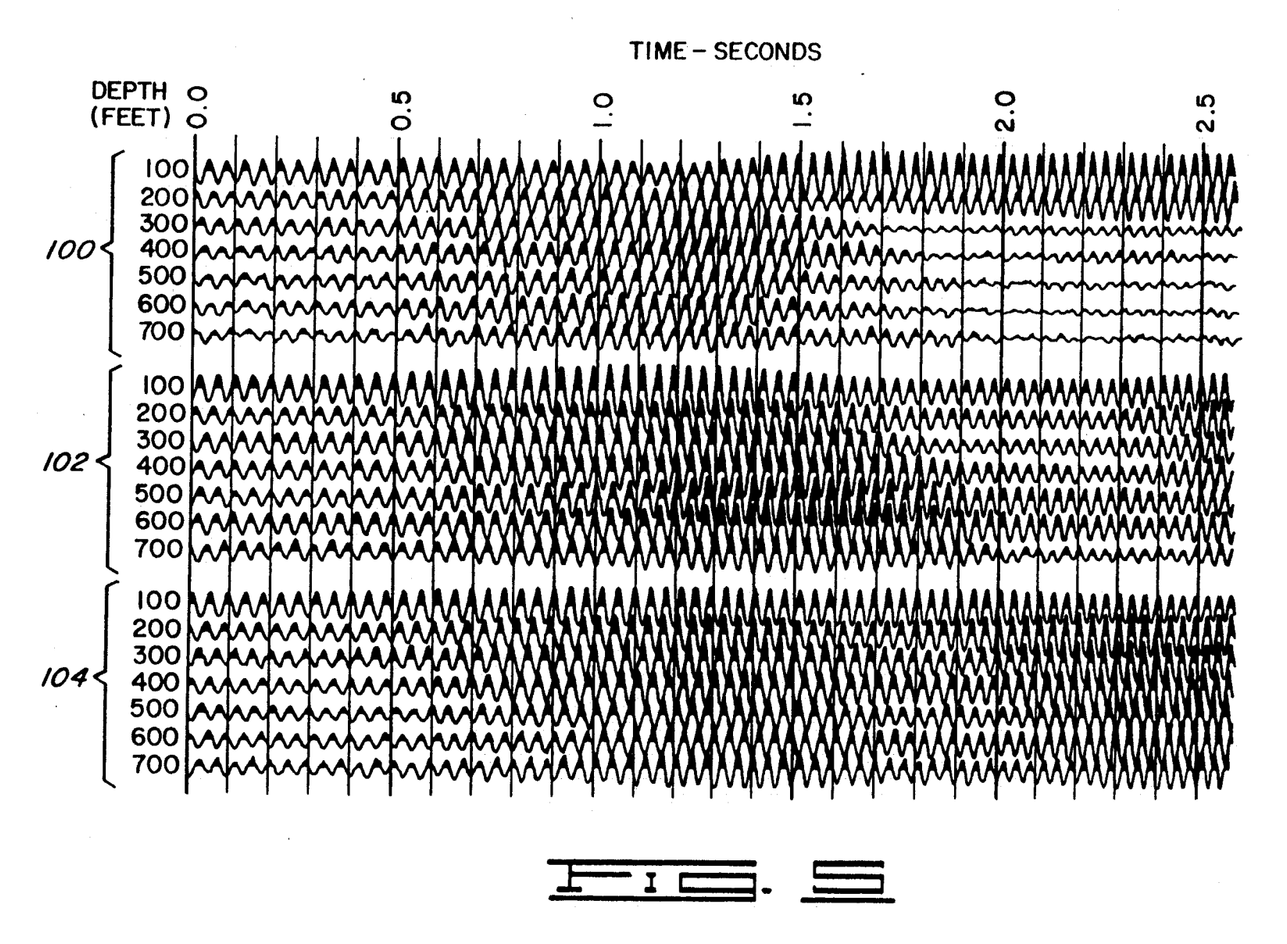
FIG. 5 is a seismogram illustrating detected compressional and shear motion in a specific test set up similar to that of FIG. 2.

In order to prove existence and behavior of elliptically polarized shear waves, the testing scheme of FIG. 2 was utilized and a sample of data derived therefrom is illustrated in FIG. 5. Thus, the orbital vibrator 40 was operated at a selected frequency and data picked up at the uppermost seven orthogonal detectors 26-32, i.e. over a period of 100 to 700 feet from the earth's surface, were recorded and processed. FIG. 5 illustrates a case where the compressional wave, or essentially the Z-axis wave, was detected and recorded across the 700 foot depth as shown by traces 100. In like manner, a first type of shear wave which we will refer to as north-south was picked up and recorded as traces 102, and oppositely polarized shear traces that we shall refer to as east-west are recorded as group traces 104.

In FIG. 5, since both compressional and shear wave signals appear at each 100 foot level detector, and since cores in that area show that both soft and hard formations exist within the 700 foot interval, it can be deduced that both compressional and shear waves travelled through both soft and hard formations. It can also be seen that both compressional and shear signals are clean signals existing all the way through the source sweep, and velocity measurements can be made by both phase and by correlation which are in close agreement. Accordingly, calculation of velocities across the 700 foot depth reveal accurate and reliable values.

Orbital source data obtained in detectors 26-32 down to 700 feet was compared with data obtained from other methods of generation, and in each case the comparisons were favorable, tending to prove presence of a strong elliptically polarized shear wave. Shear wave velocities were calculated at each of the 100-700 foot marks for shear waves derived from each of orbital, earth surface weight drop, and vibrator sources. In each case, the shear wave velocity determinations for the various depths were very close, within ten percent (10%). P wave velocities were also figured at each of the depth detectors down to 700 feet for orbital, weight drop, vibrator and marine sources disposed in the proximate location. Here again, velocity comparisons of the compressional waves in each of the depth brackets was found to be in agreement with little variation.

Thus, field tests from the surface orbital source 40 showed as follows:
1—The source produced shear waves;
2—The source produced compressional waves;
3—Shear and compressional wave velocities compare favorably with weight drop, shear and P-wave vibrator, and marine vibrator for data obtained at the same test site;
4—Recorded wave forms are not significantly distorted by reflection;
5—Velocity measurements are possible using swept frequency and phase; and
6—Second harmonic compressional waves, normally present in existing vibrators, are not present in the orbital source vibrator.

Referring again to FIG. 5, it may be noted by examination of the compressional wave traces 100 that the trace is clear and concise and contains no second harmonic compressional wave. Further, a comparison of the group 102 and the group 104 traces, the shear east-west and shear north-south traces, can be compared to show that the earth actually orbited under the effects of the vibrator. We can see that by comparing the signal occuring at (i) the 100 foot level of group traces 102 shear wave geophone to that of (ii) the signal obtained at the 100 foot level of the group traces 104. If you examine the phase between the respective 100 foot level traces, they remain 90° out of phase all the way across the sweep duration. Such 90° phase difference also occurs between traces of groups 102, 104 at each of the other respective levels at 200 feet, 300 feet and on downward. Since the phase difference exists constantly and at all levels it can be correctly deduced that the earth motion actually orbits under the influence of the vibrational particle displacement and actual elliptically polarized shear waves are being produced.

Figure 6:
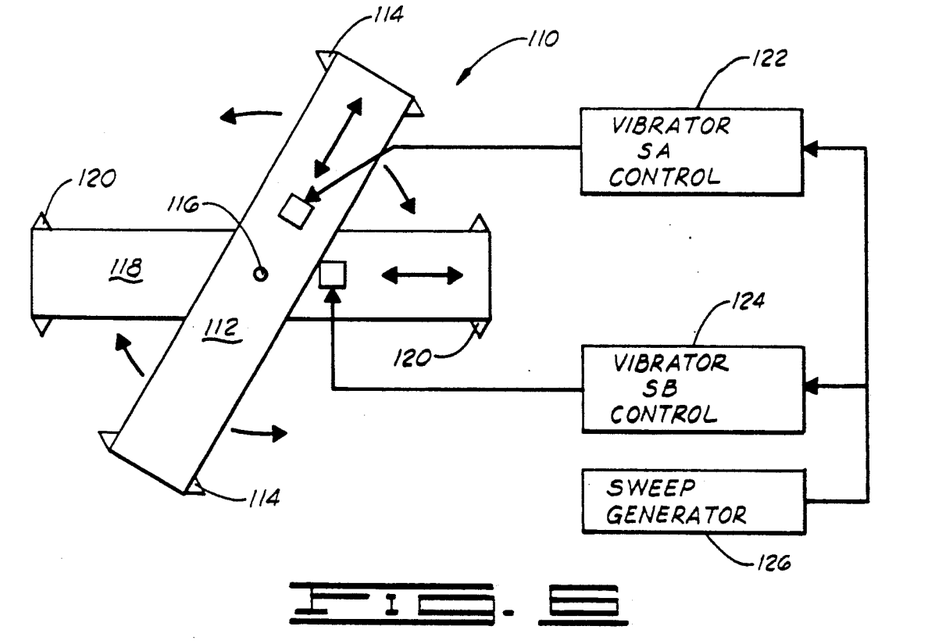
FIG. 6 is a schematic illustration of another form of elliptically polarized shear wave generator.

FIG. 6 illustrates schematically an elliptically polarized shear wave vibrator 110 that utilizes a combination of linear vibrator elements interconnected in adjustable angularity to impart an elliptical shear wave into the earth that may be adjusted as to major and minor axis relationships. Thus, a baseplate 112 having a plurality of omni-directionally resistant earth engaging elements 114 is rotatably secured by a central pinion assembly 116 to a baseplate 118 having earth engaging members 120. The vibrator baseplate 112 may be a longitudinally vibrated under control of a vibrator SA control 122 and vibrator baseplate 118 may be similarly controlled by a vibrator SB control 124. Each of the vibrator controls 122 and 124 receive sweep input from a suitable sweep generator 126; however, in the case of variation as to the vibrator control frequencies a form of frequency division or the like may be employed. Depending upon the degree of force interactions, it may be desirable to provide some vibration isolation in central pinion assembly 116.

In operation, the relative alignment of vibrators 112 and 118 may be adjusted at selected angles and the reciprocal drive force applied to each of vibrators 112 and 118 may be varied. With these variations, the eccentrically polarized shear wave can be adjusted as to displacement vector and phase relationship. In addition, this phase relationship can be still further varied by controlling the relative phases of control signals as applied from vibrator controls 122 and 124.

Figure 7:
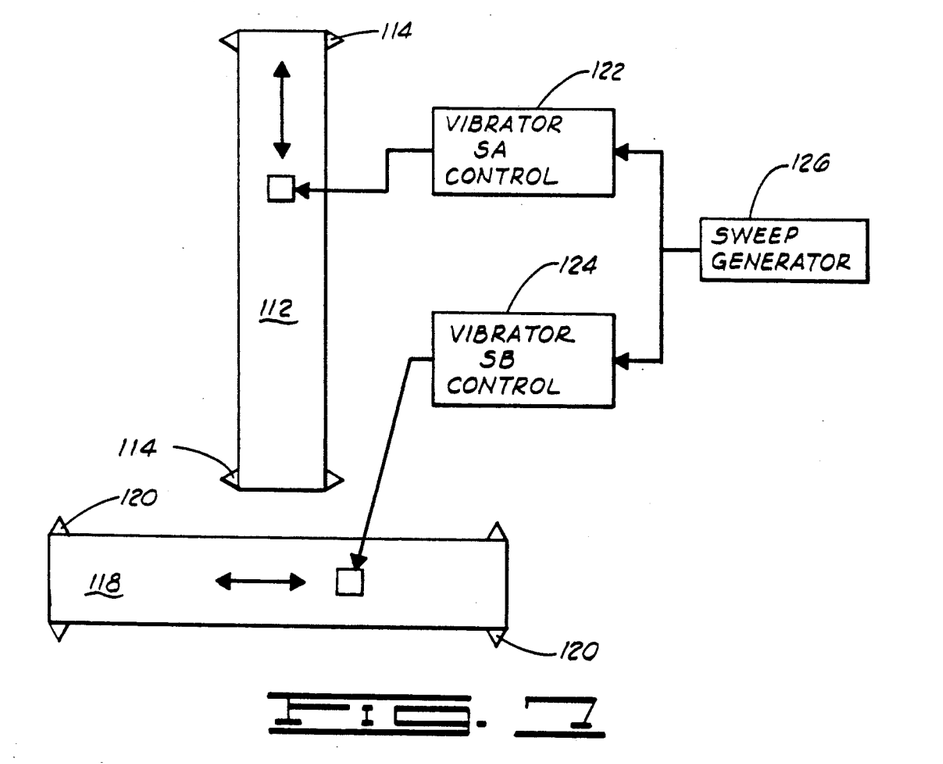
FIG. 7 is a schematic illustration of an alternative form of elliptically polarized shear wave generator.

The vibrator arrangement of FIG. 7 illustrates the similar vibrator baseplates 112 and 118 as they are operated separately but in very close alignment at their earth engagement positions. Here again, the vibrators are operated to exert a linear reciprocal force to the respective baseplate 112 and 118 as the particle displacement from the shear wave vibrations meld into an eccentrically polarized shear wave traversing downward through the earth medium. The phase difference and elliptic handedness of the polarized shear wave can be controlled by adjusting the relative phases of control signals from vibrator controls 122 and 124, and the relationship of the major and minor axes of the polarized shear wave may be varied by controlling the displacement vector or amount of vibratory force applied to each baseplate.

It is quite possible that the use of elliptically polarized shear waves will open up new modes of seismic sounding using seismic energy relationships that were heretofore unutilized. Thus, drawing from possible analogies to optical ellipsometry, it may be possible to measure ellipsometric parameters such as relative phase change and relative amplitude attentuation in order to determine physical constants for subsurface materials or in order to measure thicknesses and/or definitively identify subsurface terrain. While these possibilities exist through use of elliptical shear wave data, it is quite foreseeable that the method of the present invention will be utilized in well-logging, VSP surveys, surface seismic measurements and other related sounding techniques.

The foregoing discloses a novel method of exploration that identifies a number of seismic variables heretofore unavailable to the geophysicist and it is contemplated that use of such data will provide still more interrelated parameters for use in surveying. In addition, a source constructed and utilized in accordance with the present invention is capable of providing a unique combination of compressional and cross-polarized shear wave outputs for use in combination to achieve a greater volume of information.

Changes may be made in combination and arrangement of elements as heretofore set forth in the specification and shown in the drawings; it being understood that changes may be made in the embodiments disclosed without departing from the spirit and scope of the invention as defined in the following claims.

The embodiments of the invention in which an exclusive property or privilege is claimed are as follows:

We claim:

1. A method for generating an elliptically polarized shear wave in an earth medium, comprising:
   engaging an earth coupling member to the earth medium which is omni-directionally resistant to lateral movement relative to said earth medium; and
   applying a lateral movement in the form of a continuously rotating force vector to said earth coupling member at a selected rate of rotation;
   whereby an elliptically polarized shear wave is generated in the earth medium which is a function of the rate of rotation of said rotating force vector.

2. A method as set forth in claim 1 wherein:
   said rotating force vector is constant and said polarized shear wave is circular.

3. A method as set forth in claim 1 wherein said applying a rotating force vector step comprises:
   rotating at least one eccentric weight that is rotationally coupled centrally to the earth coupling member at a preselected rate of rotation.

4. A method as set forth in claim 3 which further includes:
   varying the direction of rotation of said at least one eccentric weight thereby to vary the handedness of rotation of said elliptically polarized shear wave.

5. A method as set forth in claim 3 which further includes:
   varying the resultant force of said at least one eccentric weight thereby to vary the displacement vector of the elliptically polarized shear wave.

6. A method as set forth in claim 4 which further includes:
   varying the resultant force of said at least one eccentric weight thereby to vary the displacement vector of the elliptically polarized shear wave.

7. A method as set forth in claim 1 wherein said step of applying further comprises:
   repetitively generating a first linear force at a first selected azimuth angle for application to said earth coupling member; and
   repetitively generating a second linear force at a selected second azimuth angle in predetermined phase relationship to said first linear force for application to said earth coupling member;
   whereby the resultant force of said first and second linear forces generates said elliptically polarized shear wave.

8. A method as set forth in claim 7 wherein:
   said earth coupling member consists of two separate earth engaging baseplates disposed in close proximity and being omni-directionally resistant to lateral movement.

9. A method as set forth in claim 7 which further includes steps of:
   varying the first and second linear forces to vary the resultant displacement vector force thereby to control the elliptical configuration of said shear wave.

10. A method as set forth in claim 9 which further includes:
    varying said first and second forces as the function of a pulse having known duration.

11. A method as set forth in claim 9 which further includes:
    varying said first and second forces as the function of a swept frequency between preselected starting and ending frequencies.

12. A method as set forth in claim 9 which further includes:
    varying said first and second forces as the function of a selected continuous frequency for a preselected duration.

13. A method as set forth in claim 7 which further includes steps of:
    controlling the relative phase of actuation of said first and second linear forces to control the direction of rotation of the resultant force thereby to control the handedness of said shear wave.

14. A method of seismic exploration comprising:
    engaging an earth medium with a seismic source generating an elliptically polarized shear wave within the medium; and
    detecting said elliptically polarized shear wave at a remote point using at least one particle motion detector and receiving and recording the data.

15. A method as set forth in claim 14 wherein:
    said remote point of detecting is at a selected position in a borehole.

16. A method as set forth in claim 14 wherein:
    said remote point of detecting is on the earth surface at a selected distance from said source.

17. A method as set forth in claim 14 wherein said step of detecting further comprises:

detecting said shear wave using a plurality of orthogonal detectors disposed in spaced position along a borehole.

18. A method as set forth in claim 17 which further includes steps comprising:

processing the received data of each orthogonally related form to yield each compressional component signal and each shear component signal.

19. A method as set forth in claim 14 which further includes steps of:

selectively reversing handedness of the elliptically polarized characteristics of the seismic source.

* * * * *

UNITED STATES PATENT AND TRADEMARK OFFICE
CERTIFICATE OF CORRECTION

PATENT NO. : 5,166,909

DATED : November 24, 1992

INVENTOR(S) : Jack H. Cole and John S. Gergely

It is certified that error appears in the above-identified patent and that said Letters Patent is hereby corrected as shown below:

Column 3, line 36, "<" should be -->--.

Signed and Sealed this

Fifth Day of October, 1993

Attest:

BRUCE LEHMAN

Attesting Officer  Commissioner of Patents and Trademarks